April 27, 1948.                L. CHAMPAIN                2,440,460
                       AUTOMOBILE AND AIRPLANE WHEEL
                   Filed June 23, 1944         2 Sheets-Sheet 1
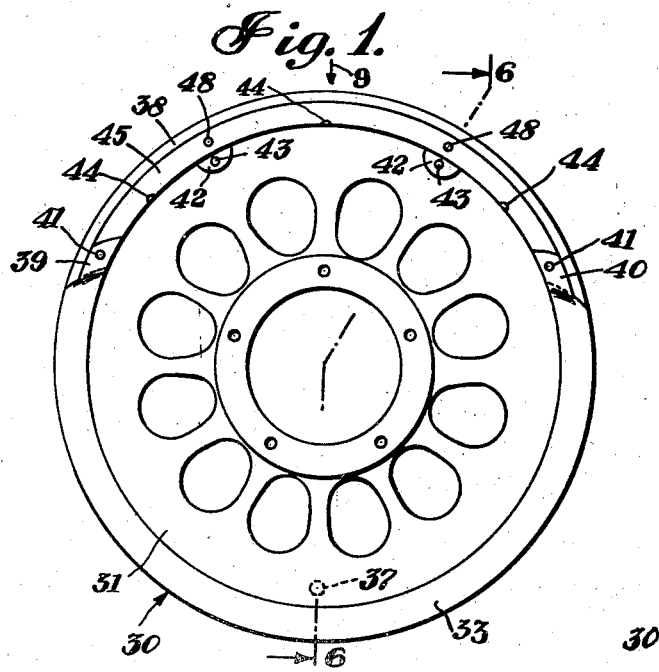
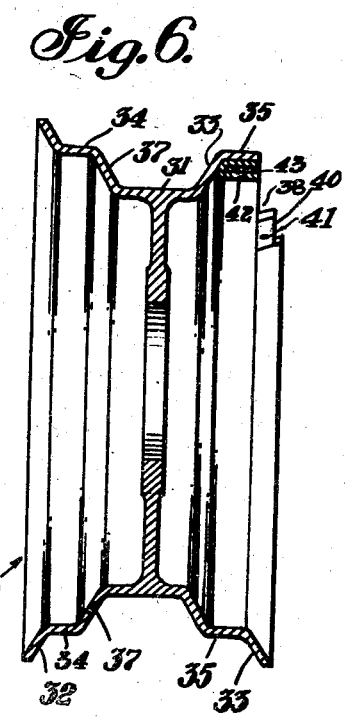
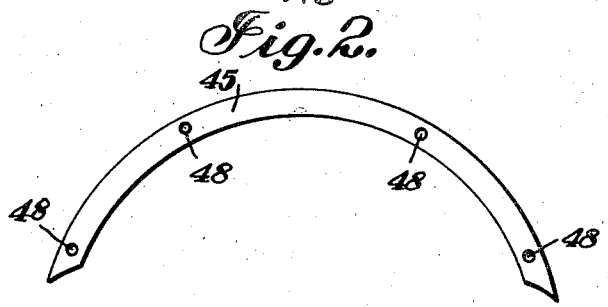
INVENTOR:
Louis Champain
BY
his ATTORNEY.

April 27, 1948.  L. CHAMPAIN  2,440,460
AUTOMOBILE AND AIRPLANE WHEEL
Filed June 23, 1944    2 Sheets-Sheet 2
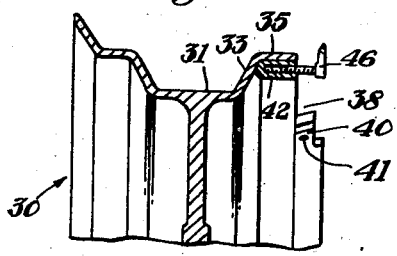
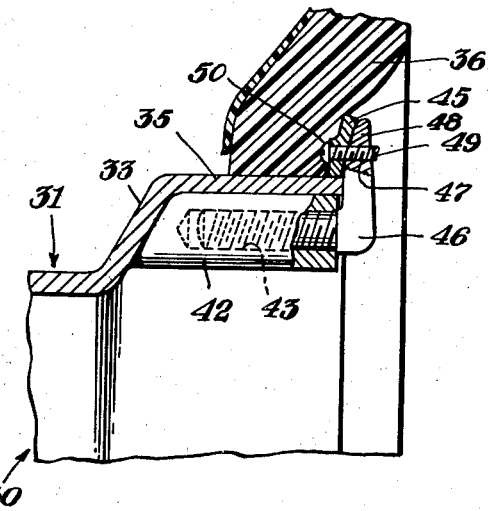
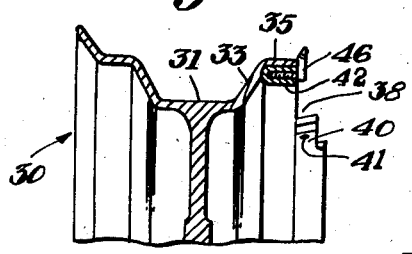
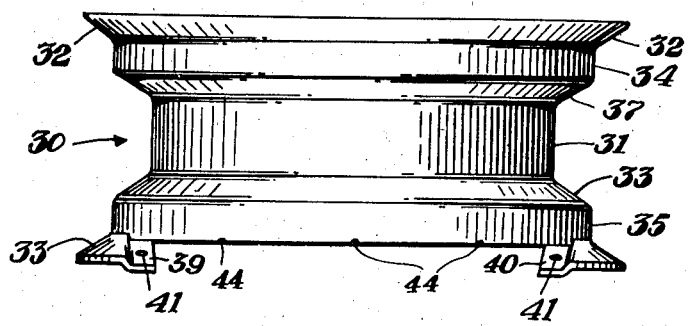
INVENTOR:
Louis Champain
BY
his ATTORNEY.

Patented Apr. 27, 1948

2,440,460

UNITED STATES PATENT OFFICE 2,440,460

AUTOMOBILE AND AIRPLANE WHEEL

Louis Champain, New York, N. Y.

Application June 23, 1944, Serial No. 541,816

3 Claims. (Cl. 152—411)

The invention relates to wheels for automobiles and airplanes and relates more particularly to wheels having a channel type rim capable of receiving a tire.

One of the principal objects of the invention is to provide a rim of the channel type having a separable rim flange section.

Another object of the invention is the provision of a rim of the channel type having a separable rim flange section for a channel type wheel rim which is safe in operation.

Another object of the invention is to provide a wheel for a vehicle including a rim of the channel type having a separable rim flange section, wherein the separable rim flange section is restrained from being accidentally detached from its engagement with the rim caused by vibrating and other forces occurring during the normal operation of the vehicle.

Another object of the invention is to provide a wheel for a vehicle including a rim capable of receiving a tire and having a separable rim flange section concentric with the rim and disposed within the outer contour of said rim and spaced therefrom to prevent the weight of the vehicle to be applied thereagainst when the tire is deflated.

Other objects of the invention will in part be obvious and will in part appear hereinafter.

With the above and other objects of the invention in view, the invention consists in the novel construction, arrangement and combination of various devices, elements and parts, as set forth in the claims hereof, one embodiment of the same being illustrated in the accompanying drawings and described in the specification.

For a fuller understanding of the nature and objects of the invention, reference should be had to the following detailed description, taken in connection with the accompanying drawings, in which Fig. 1 is an elevational view of a rim in accordance with the invention, the tire and the hooks having been left off;

Fig. 2 is an elevational view of an arcuate separable rim in flange section;

Fig. 3 is an elevational view of a flat head screw;

Fig. 4 is a plan view of the screw shown in Fig. 3;

Fig. 5 is an elevational view of a hook;

Fig. 6 is a sectional view taken along line 6—6 of Fig. 1, the separable flange section having been left off;

Fig. 7 is a sectional view similar to Fig. 6, but showing only a fragment and illustrating a hook on the rim;

Fig. 8 is a fragmentary sectional view similar to Fig. 7, but showing the hook in final threaded position on the rim;

Fig. 9 is an elevational side view of the rim seen in the direction of arrow 9 of Fig. 1, but the separable flange section having been left off; and Fig. 10 is a fragmentary sectional view similar to Fig. 8, but showing on a larger scale the completely assembled rim carrying a tire.

In carrying the invention into effect in one of the embodiments which have been selected for illustration in the accompanying drawings and for description in this specification, and referring now particularly to Figs. 1, 6 and 10, a rim of the channel type, generally designated 30, is adapted to receive a tire and comprises a main rim body 31 and two opposite integral circular side flanges 32 and 33, respectively. Said flanges 32 and 33 are flaring outwardly to engage the side walls of a conventional tire. Each of said flanges 32 and 33 comprises an integral cylindrical section 34 and 35, respectively, for providing a seat for a tire 36. One of said flanges 32 is designed to be disposed exteriorly with respect to the vehicle to which the wheel comprising the rim 30 may be attached, and said flange 32, accordingly, has a small hole 37 for receiving the air valve of the tire tube.

The other side flange 33 is normally positioned toward the vehicle, and an arcuate portion 38 has been cut out therefrom for purposes which will be related hereinafter. Said cut-out 38 is confined between two flange portions 39 and 40 of said side flange 33 and a part of the exterior of said cylindrical section 35 located between said portions 39 and 40. Said flange portions 39 and 40 are off-set outwardly with relation to said body 31, as shown most clearly in Fig. 9, and each has a threaded hole 41.

Two spaced bosses 42 are integrally provided adjacent said cylindrical section 35 of said side flange 33 and are disposed interiorly with relation thereto and near said cut-out 38, and each boss 42 has a threaded hole 43. On the exterior of said circular section 35 within the cut-out 38 are furthermore located a plurality of integral and spaced protuberances 44 which are aligned along the exterior of said cylindrical section.

An arcuate flat rim flange section 45 is detachably mounted in said cut-out 38, but extends peripherally for a distance on each side beyond the confines of said cut-out 38 to said off-set portions 39 and 40, respectively, of said side flange 33 and rests adjacent the interior surface of each of said portions in abutment thereagainst. The inner contour of said flange section 45 rests on said cylindrical section 35 and is in abutment with said protuberances 44 which aid to hold said flange section 45 in place.

In addition to the portions 39 and 40 and the protuberances 44, said flange section 45 furthermore is abutting against other holding means, for example, a pair of threaded hooks 46 which may be screwed into the threaded holes 43 of said bosses 42 until they lie close to said circular section 35, as best shown in Figs. 8 and 10. Each of said hooks 46 has a threaded hole 47, of similar properties as the threaded hole 41 of the off-set portions 39 and 40. Said detachable flange portion 45 is provided with four spaced holes 48; when said flange section 45 is properly placed on the rim 30, the holes 48 near the end thereof will be in alignment with the threaded holes 41, and, when the hooks 46 are turned outwardly, the two holes 48 located near the midway portion of the flange section 45 will be in alignment with the threaded holes 47 of said hooks 46.

Four fastening screws 49 are inserted in a direction from the inside toward the exterior with relation of said rim 30, each of said screws being inserted first through a hole 48 of said flange section 45 and then screwed into a threaded hole 41 or 47, respectively; thereby, said flange section 45 will be rigidly secured to said flange 33 by means of said four screws 49. Each of said screws 49 is provided with a round head 50 which extends interiorly from said flange section 45 towards the wall surface of said tire 36. When the tire 36 is inflated, a part of the surface thereof will lie against the interior of said flange section 45 and also against said flat heads 50 of each screw 49, thereby engaging frictionally the heads 50 and preventing an accidental turning and consequent disengagement thereof.

The radius of the outer circumference of said arcuate rim flange section 45 is smaller than the radius of the circumference of said side flanges 32 and 33, and, when said flange section 45 is secured to said side flange 33, the outer contour thereof is radially spaced from the outer contour of the portion of said side flange 32 opposite thereto. Thereby said portion of said side flange 34 will carry the major part of or even the entire weight which will be exerted from the vehicle against the rim 30 when the tire 36 is deflated.

In order to facilitate the mounting of said flange section 45, said hooks 46 have been made turnable, so that before the mounting of the flange section 45 they may be turned towards the center, thereby clearing the cylindrical portion 35, and, after the mounting of the flange section, the hooks 46 may be turned outwardly, so that they will project beyond the outer contour of the cylindrical section 35 and will have their threaded holes 47 in alignment with the corresponding holes 48 of the flange section, as hereinabove described.

It will be understood by those skilled in the art, that the mounting of the tire 36 containing a tube will be greatly facilitated by the arrangement of the separable flange section 45, according to the invention. In order to mount a tire, the flange section 45 is removed from the rim 30 and the tire mounted by first inserting a part thereof through the cut-out 38 and forcing successive parts therethrough into the endless channel formed between the body 31 and the side flanges 32 and 33. After the valve of the tube has been inserted through the hole 37, the flange section 45 is positioned in its place adjacent the side of the deflated tire 36, while the hooks 46 are turned toward the center of the rim 30. Thereafter, the hooks are turned outwardly, and four screws 49 are inserted through the holes 48 and threaded into the threaded holes 41 and 47, respectively. Since the heads 50 of said screws 49 are adjacent the tire surface, an off-set screw driver has to be used to tighten the screws 49. Thereafter, the tube may be inflated and the wheel is ready to be mounted on the vehicle. Conversely, the demounting of the tire 36 has to be preceded by a deflating of the tube, then the screws 49 will be removed from their threaded engagement, the hooks 46 turned toward the center of the rim, the flange section 45 removed from its emplacement and finally the tire may then be easily dismounted from the rim 30.

Certain of the advantages of the invention have already been herein referred to. It may be useful, however, to allude particularly at this point to the facility with which the tire may be mounted or dismounted, obviating the use of the conventional mounting tools which, in the past, have often damaged the tube or the tire walls. Mounting and dismounting may, except that the use of an off-set screw driver is required, be carried out without further special tools and without great effort.

I do not limit myself to the particular details of construction set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described the invention, what I claim as new and desire to be secured by Letters Patent is as follows:

1. A rim of the channel type having side flanges and being capable of receiving a tire, comprising a main rim body, a portion of a side flange of said main rim body being cut away, an arcuate rim flange section detachably mounted on said main body at the place where said portion of the side flange is cut away, said arcuate rim flange section being arranged for engagement with the tire at its inner surface, the radius of the circumference of said arcuate rim flange section being smaller than the radius of the circumference of the side flanges of said main rim body, holding means arranged on said main rim body for engagement with said arcuate rim flange section at the outer surface thereof, fastening means arranged for connecting said arcuate rim flange section with said holding means, and safety means arranged for locking said fastening means.

2. A rim of the channel type having side flanges and being capable of receiving a tire, comprising a main rim body, a portion of a side flange of said main rim body being cut away, an arcuate rim flange section detachably mounted on said main body at the place where said portion of the side flange is cut away, said arcuate rim flange section being arranged for engagement with the tire at its inner surface, the radius of the circumference of said arcuate rim flange section being smaller than the radius of the circumference of the side flanges of said main rim body, a plurality of holding means arranged on said main rim body for engagement with said arcuate rim flange section at the outer surface thereof, each of said holding means being provided with a threaded bore, said arcuate rim flange section having a plurality of holes registering with said bores, and a plurality of fastening screws having a head, each of said fastening screws passing through one of said holes and being screwed into one of said bores, and the head of each fastening screw being arranged on the inner surface of the arcuate rim flange section for engagement with the tire.

3. A rim of the channel type having side flanges and being capable of receiving a tire, comprising a main rim body, a portion of a side flange of said main rim body being cut away, an arcuate rim flange section detachably mounted on said main body at the place where said portion of the side flange is cut away, said arcuate rim flange section being arranged for engagement with the tire at its inner surface, the radius of the circumference of said arcuate rim flange section being smaller than the radius of the circumference of the side flanges of said main rim body, a plurality of holding means arranged on said main rim body for engagement with said arcuate rim flange section at the outer surface thereof, said main rim body having at least one threaded opening, at least one of said holding means being in the shape of each of said holding means being provided with a threaded bore, said arcuate rim flange section having a plurality of holes registering with said bores, and a plurality of fastening screws having a head, each of said fastening screws passing through one of said holes and being screwed into one of said bores, and the head of each fastening screw being arranged on the inner surface of the arcuate rim flange section for engagement with the tire.

LOUIS CHAMPAIN.

REFERENCES CITED

The following references are of record in the file of this patent:

UNITED STATES PATENTS

| Number | Name | Date |
| --- | --- | --- |
| 796,894 | Butler | Aug. 8, 1905 |
| 1,208,122 | Fleming | Dec. 12, 1916 |
| 1,289,958 | Tamburello | Dec. 31, 1918 |
| 1,348,137 | Grikscheit | July 27, 1920 |
| 1,426,307 | McGowan | Aug. 15, 1922 |
| 1,551,445 | Wagenhorst | Aug. 25, 1925 |
| 2,253,320 | Berg | Aug. 19, 1941 |

FOREIGN PATENTS

| Number | Country | Date |
| --- | --- | --- |
| 6,157 | Great Britain | 1908 |
| 97,925 | Germany | 1898 |
| 137,731 | Great Britain | 1920 |
| 455,537 | France | 1913 |
| 499,155 | France | 1920 |